Dec. 9, 1952  A. A. ISSIGONIS ET AL  2,620,679
POWER TRANSMISSION FOR MOTOR VEHICLES
Filed April 7, 1950                          5 Sheets-Sheet 1

Inventor
Alexander A. Issigonis
John N. Morris
Peter W. Harrison
By
Emery, Holcombe & Blair
Attorney Dec. 9, 1952 A. A. ISSIGONIS ET AL 2,620,679
POWER TRANSMISSION FOR MOTOR VEHICLES
Filed April 7, 1950 5 Sheets-Sheet 3

Inventor
Alexander A. Issigonis
John N. Morris
Peter W. Harrison
By
Emery, Holcombe & Blair
Attorney

FIG.6.

Dec. 9, 1952 A. A. ISSIGONIS ET AL 2,620,679
POWER TRANSMISSION FOR MOTOR VEHICLES
Filed April 7, 1950 5 Sheets-Sheet 5

Inventor
Alexander A. Issigonis
John N. Morris
Peter W. Harrison
By
Emery, Holcombe & Blair
Attorney Patented Dec. 9, 1952

2,620,679

UNITED STATES PATENT OFFICE 2,620,679

POWER TRANSMISSION FOR MOTOR VEHICLES

Alexander A. Issigonis, Oxford, John N. Morris, Edgbaston, Birmingham, and Peter W. Harrison, Croydon, England, assignors to Morris Motors Limited, Cowley, England Application April 7, 1950, Serial No. 154,602
In Great Britain April 13, 1949

16 Claims. (Cl. 74—472)

This invention relates to power transmissions for motor vehicles, of the kind in which two hydraulically-operated friction clutches control respectively low-gear and high-gear trains, and the low-gear train is provided with a freewheel coupling which overruns when both the clutches are engaged.

According to the invention selective engagement and disengagement of the clutches individually at different engine speeds is effected by hydraulic control means arranged to be influenced by the degree of opening of the engine throttle and functioning in such a way that, whether the engine is running at part throttle or full throttle, so long as the degree of throttle opening is substantially the same at the times of the respective gear changes, the automatic change from the high-gear to the low-gear train cannot occur until the vehicle speed has fallen considerably below that at which the high gear became engaged. Consequently the marked reduction in engine speed which ordinarily takes place when high gear is engaged does not cause reversion to the low-gear drive. Also, by arranging for the hydraulic control means to be influenced by the degree of throttle opening, the driver is enabled to exercise some control over the speeds at which an automatic gear-change occurs in either direction.

With a vehicle having a sufficiently high power-to-weight ratio the gearbox need only provide for two forward speeds and a reverse, in which case the present invention enables the transmission to operate entirely automatically so far as gear changing in the forward speeds is concerned, and the usual clutch pedal is not required. However, the invention is equally applicable to a transmission of the semi-automatic type having a gearbox which affords more than two forward speeds and incorporates an automatic underdrive mechanism in conjunction with manual gear changing, a clutch pedal then being provided.

Clutch engagement is effected by means of oil or other appropriate liquid supplied at a pressure which is determined by the hydraulic control means and is correlated at all times with the prevailing engine speed, and preferably also with the speed of the vehicle. When the vehicle is stationary, with the engine idling, the hydraulic pressure developed is insufficient to cause engagement of either of the clutches. But the arrangement is such that upon accelerating the engine the increased hydraulic pressure first effects engagement of the low-gear clutch, whereupon the vehicle is driven through the low-gear train, and subsequently, when the engine speed has risen enough, the pressure developed becomes sufficient to engage the high-gear clutch as well, the drive then being transmitted through the high-gear train. When the engine speed falls sufficiently, the hydraulic control means operates to cause disengagement of the high-gear clutch and the drive reverts to the low-gear train.

It is arranged for engagement and disengagement of the high-gear clutch to take place progressively, so that gear-changing in either direction can be effected without abrupt change in the relationship between the engine and vehicle speeds.

Referring now to the accompanying drawings.

Figures 1, 2:
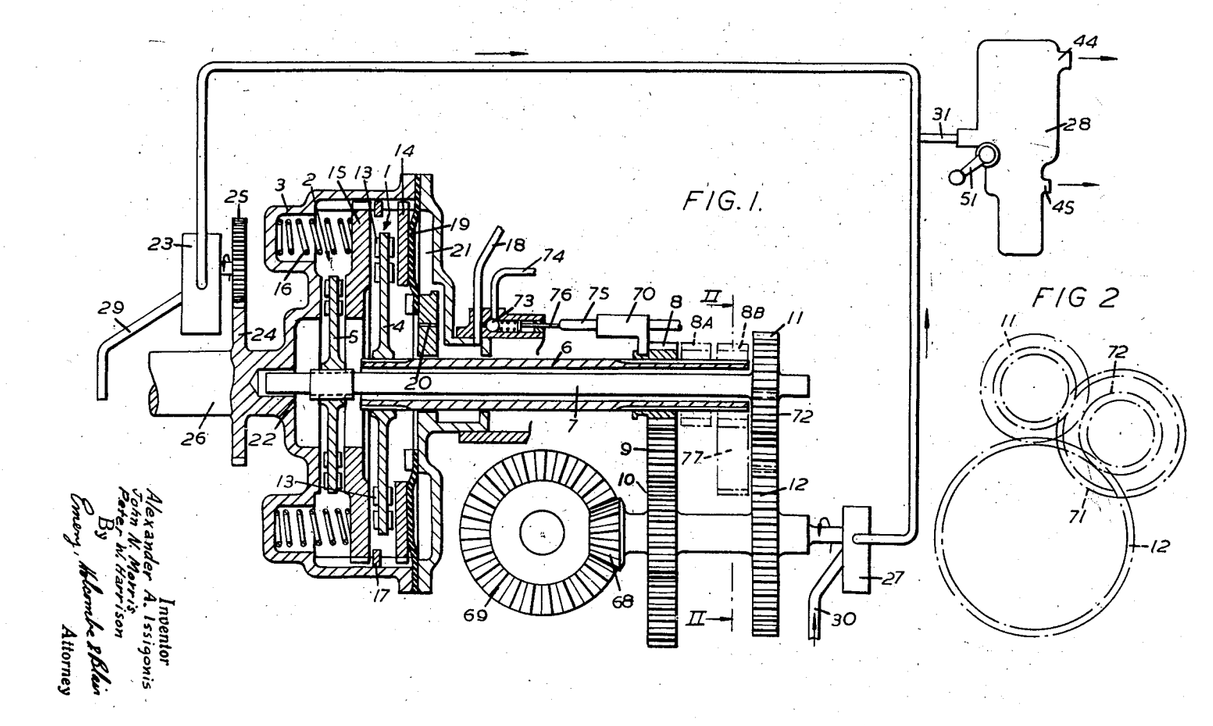
Figure 1 is a schematic illustration (partly in section) of an automatic two-speed transmission in acordance with the invention, for motor vehicles.
Figure 2 is a view on the line II—II in Figure 1.

In the case of the automatic two-speed transmission represented diagrammatically in its simplest form in Figure 1, the two clutches, indicated generally at 1 and 2, are accommodated in a substantially sealed casing 3, forming a self-contained unit, and have their respective driven plates 4 and 5 splined on co-axial shafts 6 and 7, one of which is tubular and surrounds the other. The tubular shaft 6 drives a pair of constant mesh gears 8 and 9 the latter of which has associated with it a unidirectional coupling 10 of known design, such as a roller ratchet device, permitting torque to be transmitted in the driving, but not in the overrunning, direction; this gearing 8, 9 constituting the low-gear train. The high-gear train is formed by a further pair of constant mesh gears 11 and 12, these being driven by the shaft 7.

In order to promote smooth take-up of the drive, the driven plates 4 and 5 of the clutches are fitted with wet linings 13, such as cork inserts running in oil. The driven plate 4 of the low-gear clutch 1 is situated between the pressure-plate 14 of this clutch and the pressure-plate 15 of the high-gear clutch 2. These pressure-plates are splined on the casing 3, and are spring-loaded so that the clutches remain disengaged until sufficient opposing force is applied to effect engagement. The pressure-plate 15 is acted upon by helical compression springs 16 which normally hold it against an abutment 17, and the arrangement is such that the pressure necessary to cause engagement of the high-gear clutch 2 is considerably greater than that which suffices to produce engagement of the low-gear clutch 1.

When the engine is running, oil, at a pressure regulated by the hydraulic control means (which will be described later), is delivered through a pipe 18 to one side of an annular diaphragm 19 of synthetic rubber which is co-axial with the pressure-plates of the clutches. When the oil pressure reaches a sufficient value, the deflection of the diaphragm 19 displaces the pressure-plate 14 of the low-gear clutch 1 against its spring-loading. This clutch then becomes engaged, by reason of the linings 13 of its driven plate 4 being gripped between the respective pressure-plates 14 and 15, and the drive is transmitted through the low-gear train 8, 9. Upon sufficient increase in the oil pressure applied to the diaphragm 19, the latter is able to deflect further and displace the pressure-plate 15 of the high-gear clutch 2, against the combined effects of the spring-loading of both pressure-plates, so that both clutches are now engaged and the drive is transmitted through the high-gear train 11, 12. When the oil pressure decreases sufficiently, the high-gear clutch 2 disengages itself and, subsequently, when the pressure has fallen low enough to permit the diaphragm 19 to return to its undeflected condition under the assistance of the spring-loading of the pressure-plate 14 of the low-gear clutch 1, the latter disengages itself and disconnects the drive. A small leakage 20 is provided from the chamber 21 of the diaphragm to ensure ultimate filling of the entire clutch casing with oil, and also to permit eventual de-aeration of the hydraulic system. The complete filling of the clutch casing with oil prevents the diaphragm 19 from being deflected by pressure due to centrifugal action upon the contents of its chamber 21. Near its axis the clutch casing has a "breathing" aperture 22 through which oil can return to a sump (not shown).

The hydraulic control means includes a positive displacement oil pump 23, driven by gearing 24, 25 from the engine shaft 26, the output of this pump being preferably augmented by a similar oil pump 27 driven at a speed proportional to the instantaneous speed of the vehicle, and a control unit 28 which receives the output of the engine-driven pump 23 (together with that of the vehicle-driven pump 27 when the latter is employed), and regulates the flow of oil to the diaphragm chamber 21 in accordance with the conditions prevailing at any given time. The pumps 23 and 27 draw oil from the sump through intakes 29 and 30 respectively, and discharge into a common delivery pipe 31.

Although the additional vehicle-driven oil pump 27 is not essential, it is certainly a very desirable adjunct. Not only does it serve to activate the control unit 28, and thereby effect clutch engagement, in the event of the engine having to be started by towing the vehicle; but its provision also ensures that if the vehicle is allowed to start from rest and run downhill with the engine stopped or merely idling, an unduly high speed cannot be attained before the drive is taken up. Without that provision in the circumstances envisaged, the vehicle speed might become very high and then a touch on the accelerator pedal would cause sudden engagement of the low-gear clutch. Consequently the engine would suffer very rapid acceleration, with unpleasant results.

Figures 3, 10:
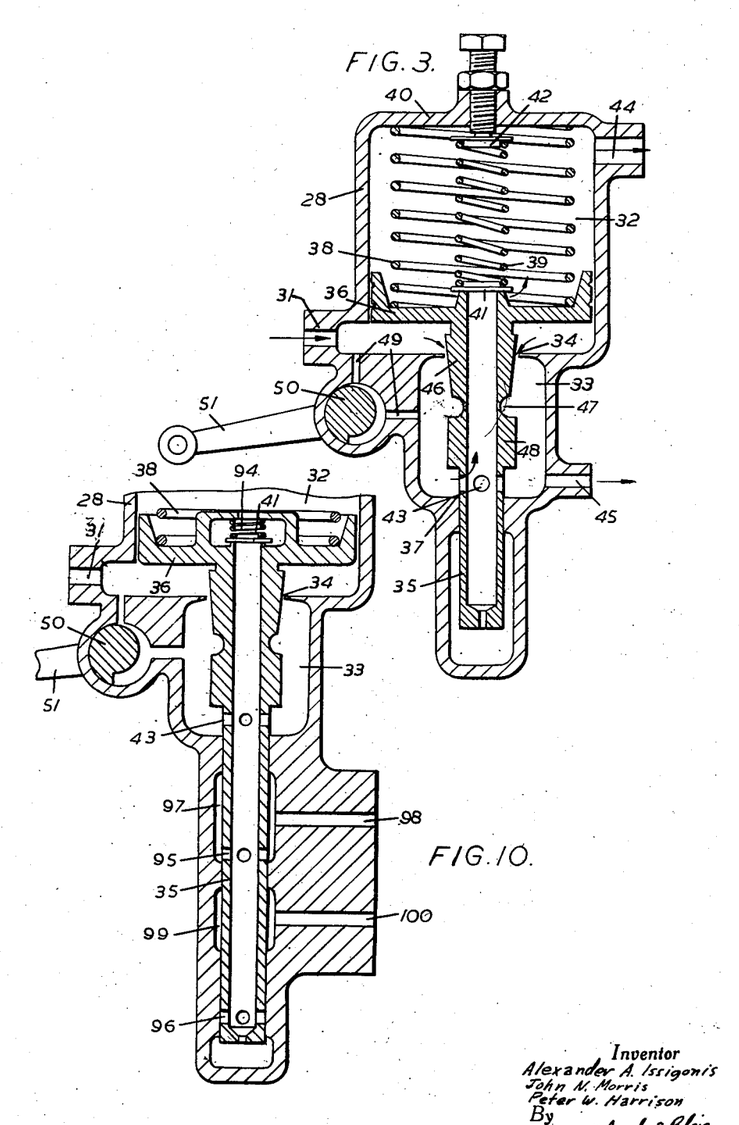
Figure 3 is a sectional elevation of a hydraulic control unit which is employed in the arrangement illustrated in Figure 1.
Figure 10 is a fragmentary sectional elevation showing how the control unit illustrated in Figure 3 may be modified to enable each clutch to be operated by its own diaphragm.

The control unit 28, shown in detail in Figure 3, comprises a co-axial pair of cylindrical chambers 32 and 33 which will be designated the primary and secondary chambers respectively, these being in permanent communication with each other through a thin-edged metering orifice 34 centrally disposed at their junction. The effective cross-sectional area of the metering orifice is regulated by the contour of the external surface of a hollow plunger 35 which extends axially through that orifice. One end of the plunger is enlarged to form a piston 36 which works in the primary chamber 32, and its other end, which is closed, passes in fluid-tight manner through the end wall 37 of the secondary chamber 33.

The plunger 35 is loaded by a pair of helical compression springs 38 and 39 which are accommodated in the primary chamber 32 and urge the plunger into a position at which the piston 36 lies (as shown) adjacent the junction of the chambers. The spring 38, which is of low rate, acts between the end wall 40 of the primary chamber 32 and the piston 36; and the other spring 39, which is of high rate, loads a disc valve 41 fitted to the open end of the plunger 35, this spring having an adjustable abutment 42 adjoining the end wall 40 of the primary chamber.

The oil delivered to the control unit 28, by the pipe 31, enters the primary chamber 32 at its junction with the secondary chamber 33 and proceeds into the latter by way of the metering orifice 34 which, when the engine is idling, is able to pass the corresponding flow of oil without sufficient pressure being created in the primary chamber 32 to cause movement of the piston 36. Most of the oil passes through holes 43 in the plunger 35 into its bore, opens the disc valve 41 and finally escapes from the primary chamber 32 through a low-pressure outlet 44 from which it returns to the sump. However, a small flow of oil proceeds from the secondary chamber 33 through an outlet 45 connected by the pipe 18 to the diaphragm chamber 21 (Fig. 1) of the clutch unit, by reason of the small leakage 20 provided from the latter chamber, but the spring load on the disc valve 41 when the engine is idling is too small to establish a back-pressure sufficient to effect engagement of the low-gear clutch 1. In this connection, if the spring 39 which loads the disc valve 41 is of constant rate, the oil pressure in the diaphragm chamber 21 will be in linear proportion to the compression of that spring, and therefore to the movement of the piston 36 and its associated plunger 35.

Although the rate of the disc valve spring 39 and the contour of the external surface of the plunger 35 may be so chosen as to afford any desired relationship between the speed of the engine and the axial displacement of the plunger; in the particular example under consideration the external surface of that portion 46 of the plunger 35 which adjoins the side of the piston 36 remote from the disc valve 41 is of frusto-conical shape and is convergent in the direction leading from the metering orifice 34 into the secondary chamber 33. At the smaller end of the frusto-conical portion 46 there is an annular groove 47, and then a substantially cylindrical portion 48 of approximately the same diameter as the larger end of the frusto-conical portion 46. Beyond the substantially cylindrical portion 48 the plunger 35 continues as a cylindrical stem of reduced diameter which passes through the end wall 37 of the secondary chamber 33.

When the engine is idling, the larger end of the frusto-conical portion 46 of the plunger 35 lies within the metering orifice 34 and, as already explained, the resulting flow of oil is ineffective to cause engagement of the low-gear clutch 1. But upon increasing the engine speed the effective cross-sectional area of the metering orifice 34 is inadequate to pass the increased flow of oil, with the result that the pressure in the primary chamber 32 rises sufficiently to initiate movement of the piston 36 against the action of its spring-loading. As the engine is accelerated, the piston 36 continues to move until it attains a position at which the spring 39 which loads the disc valve 41 has become compressed to such an extent that the oil pressure in the secondary chamber 33 is sufficient to effect engagement of the low-gear clutch 1 by deflecting the diaphragm 19 (Fig. 1). Further increase of engine speed causes additional movement of the piston 36, accompanied by an increase of the oil pressure acting on the diaphragm 19. However, before that pressure can attain a value at which it deflects the diaphragm sufficiently to initiate engagement of the high-gear clutch 2, the frusto-conical portion 46 of the plunger 35 completely leaves the metering orifice 34. The latter now has its effective cross-sectional area abruptly enlarged by the annular groove 47 of the plunger, and a substantial increase of engine speed now only produces a relatively small additional movement of the piston and plunger.

When the trailing edge of the annular groove 47 of the plunger approaches the plane of the metering orifice 34, the control unit 28 becomes violently unstable because any further movement of the piston 36 in the same direction results in a diminution of the effective cross-sectional area of the metering orifice 34, owing to the presence of the substantially cylindrical portion 48 of the plunger 35. Consequently the oil pressure acting on the piston 36 increases sharply, and the plunger is displaced suddenly to an extent equal to the axial length of its substantially cylindrical portion 48. This displacement gives rise to an abrupt increase in the back-pressure exerted by the spring 39 which acts on the disc valve 41; and, in this way, at a predetermined engine speed, the oil pressure applied to the diaphragm 19 rises steeply to a value at which the high-gear clutch 2 is firmly engaged. This condition persists notwithstanding that the engine speed has fallen considerably due to the engagement of the high-gear clutch, and the speed of the vehicle has not altered appreciably in the process. The maintenance of the considerable displacement of the plunger 35 can be assured by making its substantially cylindrical portion 48 of sufficiently large diameter with respect to that of the metering orifice 34. For example, if the portion 48 of the plunger actually fitted the metering orifice the plunger would not revert to its initial position until the engine stopped. In practice, the diameter of the portion 48 is so chosen that, with the high-gear clutch 2 engaged, the oil pressure maintained is insufficient to keep that clutch in engagement when the speed of the vehicle has fallen to a given value. Clearly this value should be sufficiently below that at which, with the low-gear clutch 1 alone engaged, the upward change of gear is arranged to occur. For example, if the automatic change from low to high gear takes place when the vehicle attains a speed of about 30 M. P. H., matters would be so arranged that the change from high to low gear would not occur until the speed had dropped to about 20 M. P. H.

The operation of the hydraulic control unit 28 is influenced by the degree of throttle opening. This is achieved by providing across the metering orifice 34 a by-pass 49 controlled by a progressively opening valve 50 which is actuated by a linkage 51 coupled with the accelerator pedal which pedal controls the throttle. The arrangement is such that when the throttle is fully opened the by-pass 49 is fully effective, and it is then necessary for the engine to attain a relatively high speed in low gear before the change-up will occur. Similarly, with the by-pass 49 open, the change-down will occur whilst the speed of the vehicle is still relatively high. With the by-pass almost closed, however, a relatively low engine speed will suffice to cause the change-up, but the change-down will not take place until the speed of the vehicle has dropped to a relatively low value. It will be appreciated that the particular engine and vehicle speeds at which clutch engagement commences, and at which gear-changing occurs in either direction, are adjustable by variation of the shape and disposition of the contoured portions of the plunger 35, and also by varying the loading and rating of the two springs 38 and 39.

As already indicated, it is arranged for engagement and disengagement of the high-gear clutch 2 to take place gradually in order to avoid any sense of shock or sudden discontinuity in the relationship between the engine and vehicle speeds at the moment of gear-changing. Such gradual engagement could be achieved by providing sufficient breathing capacity in the diaphragm chamber 21 of the clutch unit, or by the inclusion of an air bottle or its equivalent in the oil line 18 to the clutch unit. However, we prefer to incorporate in that oil line a flow-retarder (Fig. 4) comprising a vertically disposed cylindrical chamber 52 containing a hollow piston 53 which is sandwiched between a pair of centralising springs 54. The upper face of the piston has a central thin-edged aperture 55 which is largely obstructed by an axially disposed restrictor 56, the latter being essentially of synclastically convex shape and rigidly supported from the top of the chamber. The arrangement is such that normally the plane of the aperture 55 lies at the level of the maximum bulge of the restrictor 56, and consequently the effective area of the aperture 55 is then the minimum capable of permitting the small flow of oil that continually takes place, when the engine is running, due to the leakage 20 provided from the diaphragm chamber 21 of the clutch unit.

Figure 4:
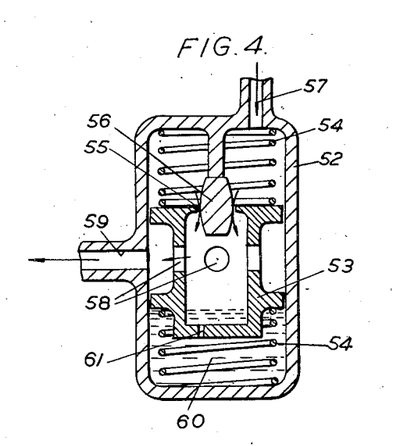
Figure 4 is a sectional elevation of a flow-retarding device which is preferably associated with the control unit shown in Figure 3.

The oil coming from the outlet 45 of the secondary chamber 33 of the control unit 28 is delivered to an inlet 57 at the top of the flow-retarder chamber 52, passes through the restricted aperture 55 into the interior of the piston 53, and then through holes 58 in the wall of the piston to a pipe 59 which leads from the side of the flow-retarder chamber to the diaphragm chamber 21 of the clutch unit by way of the pipe 18. The piston 53 of the flow-retarder remains in its normal central position whether the vehicle is running in low or high gear. But change of gear either up or down, although primarily initiated by an alteration in the static pressure only of the oil delivered by the control unit 28, must nevertheless be accompanied by some flow in one direction or the other by reason of the breathing capacity (limited though it may be) of the diaphragm chamber 21 of the clutch unit. Such a flow is not immediately possible to the extent which would ordinarily be necessary, because the effective area of the aperture 55 associated with the restrictor 56 is at its minimum. In consequence, upon change of gear being initiated in either direction a substantial difference of pressure is established across the aperture 55 and causes the piston 53 to move, with the result that the effective area of that aperture becomes greater temporarily to cater for the transient increased flow. The lower end of the piston 53 is immersed in oil 60 and has a small hole 61 in it to provide a dash-pot action for retarding the movement of the piston, thus preventing a too rapid extension or deflation of the diaphragm 19.

Figure 5:
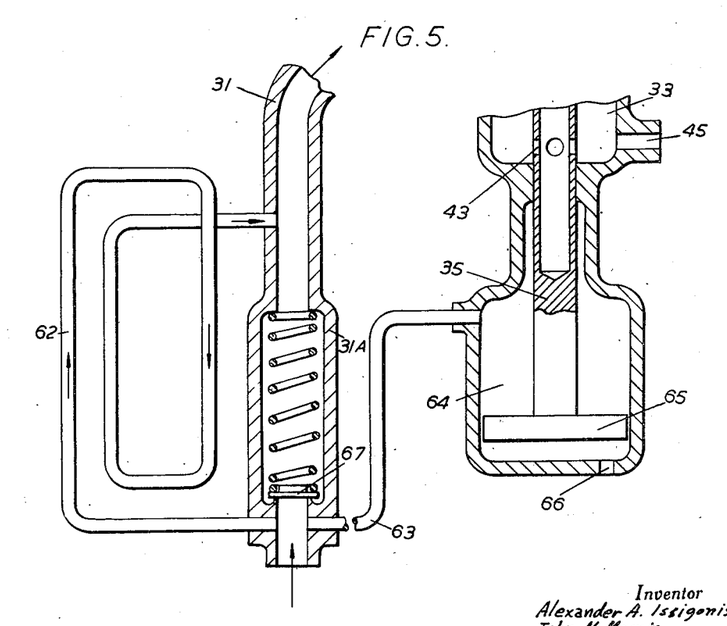
Figure 5 illustrates how the control unit shown in Figure 3 may be modified in order to compensate for variation of the viscosity of the liquid employed to operate the hydraulic clutches.

In cold weather, the viscosity of the oil in the hydraulic circuit may be sufficiently high to occasion premature engagement of the low-gear clutch 1 at starting, owing to the increased viscosity of the oil creating a sufficient difference of pressure across the metering orifice 34 of the control unit 28 to cause premature movement of the plunger 35. In order to compensate for the effect of variation of the oil viscosity upon the initial engagement of the low-gear clutch 1, the control unit 28 is modified as indicated in Figure 5. The pipe 31 through which oil is pumped to the primary chamber 32 of the control unit 28 is provided with a long narrow section or similar tortuous passage 62 which offers high resistance to the flow of abnormally viscous oil. When the oil is of normal viscosity it can flow through the passage 62 and into the primary chamber of the control unit during the initial process of low-gear clutch engagement without building up a substantial pressure difference. If, however, the oil is sufficiently cold the pressure engendered by this path causes a considerable back-pressure; that is to say, a substantial build-up in pressure on the inlet side of the restrictive passage 62. A connection 63 leads from this point to an auxiliary chamber 64 which is preferably co-axial with the secondary chamber 33 of the control unit 28 and contains a compensating piston 65 attached to the stem of the plunger 35 of that unit. The auxiliary chamber 64 has a vent 66 to atmosphere and the arrangement is such that, when the oil viscosity is abnormally high, the increased back-pressure occurring at the inlet side of the restrictive passage 62 is transmitted to the compensating piston 65 in such a way that this piston, and thus the plunger 35 of the control unit, is abnormally loaded in a direction which tends to prevent its premature movement which would otherwise result from the abnormally viscous condition of the oil.

In order to preclude unduly high pressures arising at the inlet to the restrictive passage 62 when the oil flow becomes appreciable with further increase in engine speed above that obtaining during the initial clutching stage, a spring-loaded by-pass valve 67 is arranged, in an enlargement 31A of the pipe 31, in parallel with the restrictive passage 62. This valve opens when the pressure build-up across the restrictive passage 62 exceeds a certain value. The arrangement is such that when the engine speed is high, and thus the volume of oil flow is considerable, the by-pass valve 67 will normally be maintained open. Under these conditions the arrangement merely imposes a finite and limited back-pressure which is always operative upon the compensating piston 65 under conditions of high engine speed.

Reverting to Figure 1, the final drive to either the front or rear wheels of the vehicle comprises the usual bevel pinion 68 and crown wheel 69. The pinion 8 is slidable on its splined shafts 6, by a manually-operable gear selector 70, into the positions indicated at 8A and 8B. When the pinion 8 is at 8A the transmission is in neutral, and when it is at 8B a reverse gear train 71, 72 is engaged. A spring-loaded ball-valve 73 is arranged, as shown, in communication with the oil inlet pipe 18, this valve controlling a pressure-relief pipe 74 through which oil can be spilled to the sump. So long as the pinion 8 is in engagement with the gear 9, the shaft 75 of the gear selector 70 depresses a control plunger 76 which compresses the spring of the ball-valve 73 sufficiently to permit the eventual development of an oil pressure adequate to effect engagement of the high-gear clutch 2 after engagement of the low-gear clutch 1. However, selection of either neutral or the reverse gear train causes the selector shaft 75 to recede from the oil-spill control plunger 76, and the consequent reduction of the spring-loading on the ball-valve 73 results in the latter relieving the oil pressure by way of the pipe 74, so that the available pressure is sufficient only to operate the low-gear clutch 1.

Figure 6:
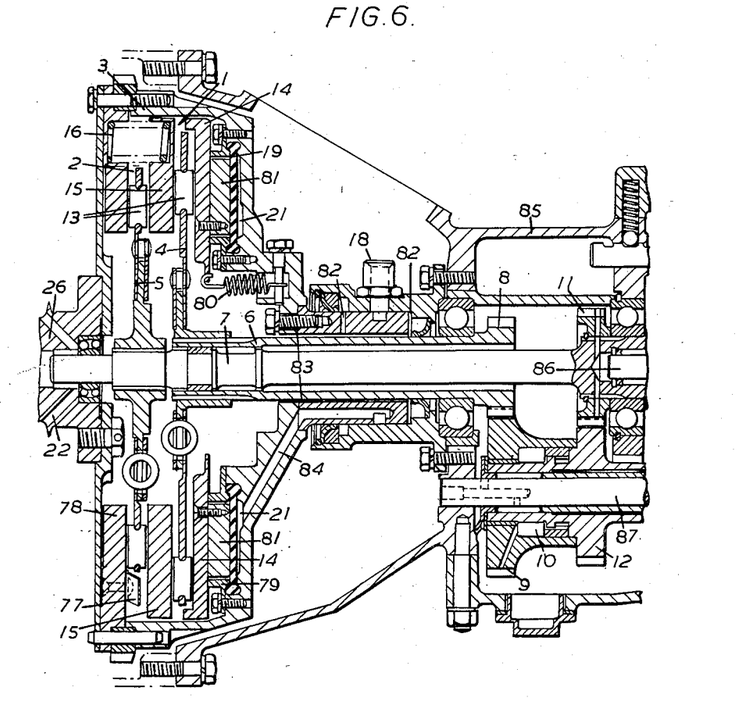
Figure 6 is a sectional elevation of part of a semi-automatic transmission in accordance with the invention, for motor vehicles, and shows the preferred form of the clutches which are illustrated diagrammatically in Figure 1.

Figure 6 shows the preferred form of construction of the clutch unit (which, as already pointed out, is only represented diagrammatically in Figure 1), and illustrates part of a semi-automatic transmission in accordance with the invention. Corresponding parts in Figures 1 and 6 are designated by the same reference numerals, but the two oil pumps 23 and 27 and the control unit 28 are not shown in Figure 6. The abutment 17 (Fig. 1) for the pressure-plate 15 of the high-gear clutch is constituted by separate members, none of which appear in the particular cross-section represented by Figure 6. The pressure-plate 15 is mounted on three blade springs 77 disposed as symmetrical chords and secured to a fixed plate 78, only a portion of one of these blade springs being visible in Figure 6. The same arrangement of blade springs is also employed for resiliently mounting the pressure-plate 14 on a fixed ring 79, but none of these springs is visible in Figure 6. The pressure-plate 14 is acted upon by tension springs 80 which assist the return of the diaphragm 19 to its undeflected position upon disengagement of the low-gear clutch 1. The diaphragm 19 bears against a ring 81 which is carried by the pressure-plate 14. The restricted leak 20 (Fig. 1) from the diaphragm chamber 21 is constituted, in the construction shown in Figure 6, by ducts 82 and a clearance space 83 around the shaft 6. A duct 84 conveys the oil from the inlet 18 to the diaphragm chamber 21.

The low-gear train 8, 9 and the high-gear train 11, 12 in the case of the transmission illustrated in Figure 6 are accommodated in the front portion of a manually-controlled gearbox 85 of orthodox design affording three or four forward speeds and a reverse drive. This gearbox has a mainshaft 86 and a layshaft 87, the latter carrying the gears 9 and 12 and the unidirectional coupling 10. It will be appreciated that the automatic operation of the clutches 1 and 2 takes place in the manner already described with reference to Figure 1, whichever of the forward speeds of the gearbox 85 is in use at any time. That is to say, an underdrive through the low-gear train 8, 9 is associated with each of the forward gear ratios.

Figure 7:
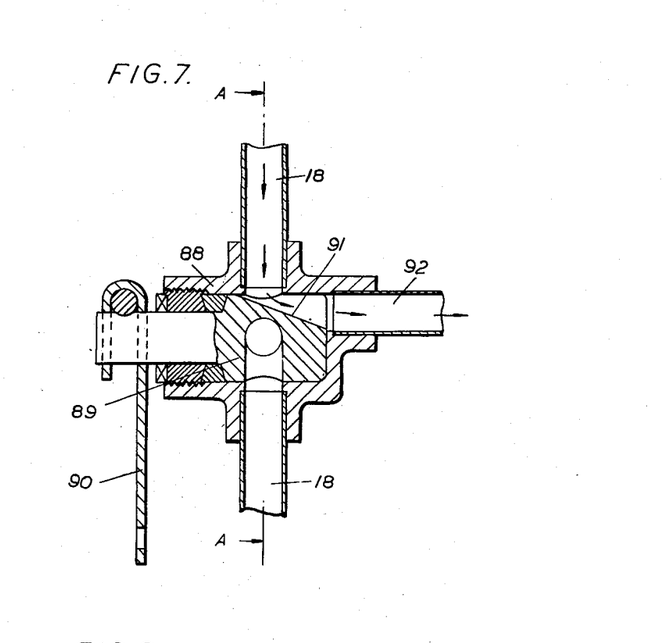
Figure 7 is a sectional elevation of an overriding control device employed with the transmission shown in Figure 6.
Figure 8:
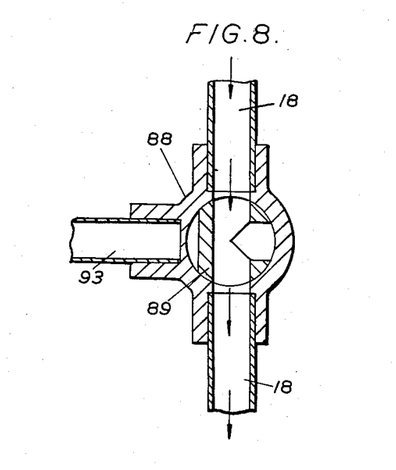
Figures 8 and 9 are sections on the line A—A in Figure 7, showing the two positions of adjustment of the device.
Figure 9:
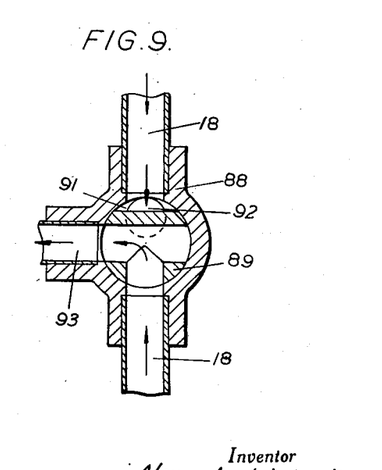

In order to permit manual gear changing in the gearbox 85, provision must be made whereby the driver can override the control unit 28 and effect disengagement of both the clutches 1 and 2. All that is necessary in this respect is to include, in the delivery pipe 18 (Fig. 6) leading to the diaphragm chamber 21, some form of control valve operable by a pedal which corresponds with the normal clutch pedal. One form of overriding control device 88 is illustrated in Figures 7 to 9. It comprises a two-way rotary plug valve 89 which is fitted in the pipe 18 and is actuated by a lever 90 linked to the clutch pedal (not shown). The valve 89 is formed with an inclined notch 91, and the arrangement is such that when this valve is in the setting indicated in Figures 7 and 9 the oil delivered to the pipe 18 from the control unit 28, instead of proceeding to the diaphragm chamber 21, is divereted to the sump through a by-pass pipe 92. At the same time, the pressure of the oil within the diaphragm chamber 21 is relieved by way of a pipe 93 which leads to the sump. When, however, the valve 89 is rotated into the position shown in Figure 8, the oil delivered from the control unit 28 passes into the diaphragm chamber 21 to effect clutch engagement.

Instead of employing a single diaphragm 19 for operating both of the clutches 1 and 2 in the manner described, each of these clutches may be actuated by its own diaphragm. In this case the control unit 28 is modified as shown in Figure 10. The disc valve 41 is now loaded by a spring 94 of constant rate, instead of by the high-rate spring 39 (Fig. 3), and the hollow plunger 35 is lengthened and provided with two further sets of holes 95 and 96. Oil from the secondary chamber 33 is delivered by way of the holes 43 and 95 to a port 97 and thence to a duct 98 which is connected to the diaphragm chamber of the low-gear clutch 1. When the piston 36 rises sufficiently, owing to increase of the oil pressure in the manner previously explained, the holes 96 come into communication with a port 99 having associated with it a duct 100. The latter is connected to the diaphragm chamber of the high-gear clutch 2, the flow-retarder 52 (Fig. 4) being interposed, so that this clutch then becomes engaged.

When employing separate diaphragms for operating the clutches of the semi-automatic transmission (Fig. 6), it is of course necessary to provide an overriding control device (such as that illustrated in Figures 7 to 9) in each of the pipes which connect the ducts 98 and 100 (Fig. 10) with the respective diaphragm chambers, the two overriding control devices being interlinked so as to be operable in unison by the clutch pedal.

We claim:

1. A power transmission for motor vehicles including a system for engaging and disengaging a clutch, having a pressure source, clutch actuating means, a fluid circulating therebetween, a control unit located between said pressure source and said clutch actuating means, said control unit comprising a passageway for said fluid having an inlet, an outlet, an intermediate metering orifice and a variable pressure-relief valve on the outlet side of said metering orifice, the pressure required to open said relief valve being responsive to the pressure in said inlet, a movable control member at said metering orifice responsive to the pressure in said inlet, said control member varying as it moves the effective area of the metering orifice and thus regulating the pressure in the inlet and consequently the pressure required to open the relief valve and the pressure at the outlet, said control member opening said orifice as it moves in response to increased inlet pressure suddenly to a greater, then suddenly to a less and finally to a constant portion of its total area, said sudden decrease in area terminating as the inlet pressure equals that required to operate the clutch actuating means, as a result of which said control member is then subjected to sudden pressure and forced well beyond the orifice varying portion thereof so that moderate subsequent decreases in inlet pressure and consequent movement of the control member have no substantial effect on the effective area of the orifice and existing pressure against the clutch actuating means.

2. A power transmission as claimed in claim 1 including also an engine shaft, constant mesh low-gear and high-gear trains having separate drive shafts, a pair of friction clutches each disposed between the engine shaft and the corresponding one of said drive shafts, an output shaft common to said gear trains, and a freewheel coupling associated with the low-gear train, said coupling overrunning when said clutches are both engaged, and the pressure supplied by said pressure source being responsive to change in the speed of the engine shaft for effecting selective engagement and disengagement of said clutches individually at different engine speeds.

3. A power transmission as claimed in claim 2 in which said pressure source comprises a positive displacement pump driven by said engine shaft and a second positive displacement pump driven by said output shaft and said control unit receives the combined outputs of both of said pumps.

4. A transmission as claimed in claim 3 in which the control member suddenly decreases the orifice area just before the outlet pressure becomes sufficient to engage the high-gear clutch.

5. A transmission as claimed in claim 1 in which the pressure relief valve is also loaded by a spring.

6. A transmission as claimed in claim 1 and associated with an engine having a throttle, in which a channel bypasses the metering orifice and flow in the channel is regulated by a valve which moves with movement of the engine throttle.

7. A transmission as claimed in claim 1 in which the control unit passageway extends on the inlet side of the metering orifice to an end-wall further from the orifice than the inlet and in which the control member is a spring-loaded plunger extending through said metering orifice and enlarged on the inlet side thereof to form a piston working in said passageway beyond the inlet.

8. A transmission as claimed in claim 7 in which said plunger is hollow and carries the pressure relief valve at the end nearer the control unit inlet.

9. A variable-speed power transmission for a motor vehicle in which two hydraulically-operated friction clutches control respectively low-gear and high-gear trains and the low gear train is provided with a free-wheel coupling which overruns when both the clutches are engaged, and in which a flow of pressure-liquid effects selective engagement and disengagement of the clutches individually at different engine speeds, said flow being regulated in accordance with the conditions prevailing at any one time by a hydraulic control unit which receives the combined outputs from two positive displacement pumps driven one by the engine and the other at a speed proportional to the instantaneous speed of the vehicle, said hydraulic control unit comprising a co-axial pair of primary and secondary cylindrical chambers in permanent communication with each other by means of a thin-edged metering orifice through which the pressure liquid flows from the primary to the secondary chamber before being discharged from the unit, and a spring-loaded plunger slidable in said orifice which plunger is enlarged at one end to form a piston working in the primary chamber, the external diameter of said plunger varying to regulate the effective cross-sectional area of the metering orifice upon axial displacement of the plunger in response to variation of the liquid pressure acting upon the piston, the action of the control unit being such that the automatic change from the high-gear to the low-gear train cannot occur until the vehicle speed has fallen considerably below that at which the high-gear clutch became engaged.

10. A transmission as claimed in claim 9 for use in association with an engine having a throttle and control means therefor, in which the flow of pressure liquid through said control unit is also regulated by movement of a valve responsive to movement of the throttle control means.

11. A variable speed power transmission for motor vehicles according to claim 10, in which the plunger is hollow and is provided with holes which enable the pressure-liquid to enter its bore from the secondary chamber, communication between the bore of the plunger and the primary chamber being regulated by a spring-loaded disc valve which, when open, permits spillage of pressure liquid from the primary chamber.

12. A variable-speed power transmission for motor vehicles according to claim 9, in which the clutches are accommodated in a substantially sealed casing containing an annular flexible diaphragm which, when subjected to the action of liquid pressure regulated by the hydraulic control unit, is deflected first to an extent sufficient to cause engagement of the low-gear clutch alone and then to an extent sufficient to effect engagement of the high-gear clutch upon the applied liquid pressure attaining a sufficiently high value.

13. A variable-speed power transmission for a motor vehicle in which two hydraulically operated friction clutches control respectively low-gear and high-gear trains, and the low-gear train is provided with a free-wheel coupling which overruns when both the clutches are engaged, and in which a flow of pressure liquid effects selective engagement and disengagement of the clutches individually at different engine speeds, said flow being regulated in accordance with the conditions prevailing at any one time by a hydraulic control unit which unit comprises a co-axial pair of primary and secondary cylindrical chambers in permanent communication with each other by means of a thin-edged metering orifice through which the pressure liquid flows from the primary to the secondary chamber before being discharged from the unit, and a spring-loaded plunger slidable in said orifice which plunger is enlarged at one end to form a piston working in the primary chamber, the external diameter of said plunger varying to regulate the effective cross-sectional area of the metering orifice upon axial displacement of the plunger in response to variation of the liquid pressure on the piston, the diameter of one longitudinal zone of said plunger increasing sharply to that of a zone of constant diameter, the plunger being so positioned relative to said orifice that as the pressure on said piston approaches that required to engage the high-gear clutch it forces the zone of sharply increasing diameter through the orifice, thereby sharply reducing the effective cross-sectional area of the orifice and suddenly increasing the pressure on the piston, thus forcing the zone of constant diameter well into the orifice so that the piston pressure must be reduced sufficiently to draw this zone of constant diameter out of the orifice before the high-gear clutch will be disengaged.

14. A transmission as claimed in claim 13 for use in association with an engine having a throttle and control means therefor, in which the flow of pressure liquid through said control unit is also regulated by movement of a valve responsive to movement of the throttle control means.

15. A variable speed power transmission for motor vehicles according to claim 14, in which the plunger is hollow and is provided with holes which enable the pressure-liquid to enter its bore from the secondary chamber, communication between the bore of the plunger and the primary chamber being regulated by a spring-loaded disc valve which, when open, permits spillage of pressure-liquid from the primary chamber.

16. A variable-speed power transmission for motor vehicles according to claim 13, in which the clutches are accommodated in a substantially sealed casing containing an annular flexible diaphragm which, when subjected to the action of liquid pressure regulated by the hydraulic control unit, is deflected first to an extent sufficient to cause engagement of the low-gear clutch alone and then to an extent sufficient to effect engagement of the high-gear clutch upon the applied liquid pressure attaining a sufficiently high value.

ALEX. A. ISSIGONIS.
JOHN N. MORRIS.
PETER W. HARRISON.

REFERENCES CITED

The following references are of record in the file of this patent:

UNITED STATES PATENTS

| Number | Name | Date |
|---|---|---|
| 794,899 | Sturtevant | July 18, 1905 |
| 876,164 | Ford | Jan. 7, 1908 |
| 1,523,648 | Jackson | Jan. 20, 1925 |
| 1,877,102 | Whitesell | Sept. 13, 1932 |
| 2,094,449 | Forichon | Sept. 28, 1937 |
| 2,159,170 | Maybach | May 23, 1939 |
| 2,272,684 | Vickers | Feb. 10, 1942 |
| 2,335,829 | McBride | Nov. 30, 1943 |

FOREIGN PATENTS

| Number | Country | Date |
|---|---|---|
| 151,203 | Austria | Oct. 25, 1937 |
| 729,567 | France | July 26, 1932 |
| 890,868 | France | Feb. 2, 1944 |